United States Patent
Nickurak et al.

(10) Patent No.: US 9,679,039 B1
(45) Date of Patent: Jun. 13, 2017

(54) CONTINUOUS PROTECTION OF DATA AND STORAGE MANAGEMENT CONFIGURATION

(71) Applicant: EMC IP Holding Company LLC, Hopkinton, MA (US)

(72) Inventors: Jeremy J. Nickurak, Edmonton (CA); Steven Bromling, Edmonton (CA); Victor Salamon, Edmonton (CA); Peter D. Cutts, Millbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/822,060

(22) Filed: Aug. 10, 2015

Related U.S. Application Data

(63) Continuation of application No. 13/340,958, filed on Dec. 30, 2011, now Pat. No. 9,128,901.

(51) Int. Cl.
*G06F 17/30* (2006.01)

(52) U.S. Cl.
CPC ...... *G06F 17/30575* (2013.01); *G06F 17/302* (2013.01); *G06F 17/30088* (2013.01)

(58) Field of Classification Search
CPC ......... G06F 17/30575; G06F 17/30088; G06F 17/302
See application file for complete search history.

(56) References Cited

U.S. PATENT DOCUMENTS

| | | | | |
|---|---|---|---|---|
| 7,346,623 | B2 * | 3/2008 | Prahlad | G06F 11/1435 |
| 7,934,018 | B1 * | 4/2011 | Lavallee | H04L 67/1097 |
| | | | | 709/218 |
| 8,352,717 | B2 * | 1/2013 | Campbell | G06F 11/1417 |
| | | | | 713/2 |
| 2003/0158834 | A1 * | 8/2003 | Sawdon | G06F 17/30067 |
| 2006/0282471 | A1 * | 12/2006 | Mark | G06F 17/30088 |
| 2010/0293143 | A1 * | 11/2010 | Jayaraman | G06F 17/30566 |
| | | | | 707/640 |
| 2011/0107025 | A1 * | 5/2011 | Urkude | G06F 11/2094 |
| | | | | 711/112 |
| 2011/0270892 | A1 * | 11/2011 | Chou | G06F 3/0605 |
| | | | | 707/802 |
| 2011/0307674 | A1 * | 12/2011 | Ryu | G06F 9/4418 |
| | | | | 711/162 |
| 2012/0151443 | A1 * | 6/2012 | Rohde | G06F 8/71 |
| | | | | 717/121 |

(Continued)

*Primary Examiner* — Ryan Bertram
(74) *Attorney, Agent, or Firm* — Muirhead and Saturnelli, LLC

(57) ABSTRACT

A system is provided for continuous protection of data and storage configuration metadata. Content protected by snapshots, for example, in connection with continuous snapshotting and/or continuous data protection, may be extended to include not only user data but further include configuration metadata of the storage management system. In particular, a user may want to rollback a storage management system to a past point due to performance or stability issues attributed to configuration changes. The system described herein enables rollback to prior states based on storage configuration metadata in addition to rollback of user data and provides for synchronization of the data and configuration metadata in connection with a rollback. The system also enables roll forward processing.

15 Claims, 11 Drawing Sheets

(56) References Cited

U.S. PATENT DOCUMENTS

| | | | |
|---|---|---|---|
| 2013/0007388 A1* | 1/2013 | Kito | G06F 3/0608 711/162 |
| 2013/0117240 A1* | 5/2013 | Taylor | G06F 17/30132 707/690 |
| 2016/0072886 A1* | 3/2016 | Lin | H04L 67/1097 709/213 |

* cited by examiner

CONTINUOUS PROTECTION OF DATA AND STORAGE MANAGEMENT CONFIGURATION

CROSS-REFERENCE TO RELATED APPLICATIONS

This application is a continuation of U.S. patent application Ser. No. 13/340,958 filed on Dec. 30, 2011 (pending).

TECHNICAL FIELD

This application relates to computer storage devices, and more particularly to the field of maintaining copies of data for computer storage devices.

BACKGROUND OF THE INVENTION

Host processor systems may store and retrieve data using a storage device containing a plurality of host interface units (host adapters), disk drives, and disk interface units (disk adapters). Such storage devices are provided, for example, by EMC Corporation of Hopkinton, Mass., and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

In some instances, it is desirable to provide a point-in-time copy of a logical volume. An example of a logical point-in-time copy version of the volume may be a snapshot copy that may be obtained relatively quickly and without significant overhead by creating a data structure initially containing pointers that point to sections of the logical volume. As data is written to sections of the logical volume (e.g., tracks) two different versions of data are maintained. A first version of the data represents the original data that existed when the snapshot was initiated and a second version of the data represents the new data being written. Any subsequent writes to the same section overwrite the second version. A snapshot does not replicate a full copy of the data set (referred to as a production data set). Rather, the snapshot only stores differences between a current version of the production data set and the version of the data set at the point in time when the snapshot was taken. There are many different specific mechanisms for providing snapshot copies, see, for example, U.S. Pat. No. 7,340,489 to Vishlitzky, et al., entitled "Virtual Storage Devices," and U.S. Pat. No. 6,792,518 to Armangau et al., entitled "Data Storage System Having Mata [Meta] Bit Maps for Indicating Whether Data Blocks are Invalid in Snapshot Copies," which are both incorporated by reference herein and are both assigned to EMC Corporation.

Snapshots are useful for recovering from logical errors. For example, if a logical device contains data for a database for which a point-in-time copy is made at 10:00 a.m., and a user inadvertently erases important data at 11:00 a.m. (or a program error causes corruption of the data for the database), then it is possible to recover the 10:00 a.m. version of the data using the snapshot. Note also that, since a snapshot may be initiated by creating a table of pointers to actual data, then there is relatively little overhead/time associated with creating a snapshot.

Users of storage management systems may make use of snapshot products, and/or other point-in-time data copy products, to establish a line of "history" for all the user data that flows through the system. Known solutions offer facilities to allow users to roll their data back to a point in past history. However, problems in known solutions may occur in situations where the user wants to roll back to a past point due to performance or stability issues attributed to storage system configuration changes. In such a scenario, a data rollback only may not be sufficient to address the performance or stability issues.

Accordingly, it would be desirable to provide for system that enables point-in-time copy and rollback features that addressed the above-noted issues and problems.

SUMMARY OF THE INVENTION

According to the system described herein, a method for performing point-in-time copy processing in a storage system is provided. The method includes creating a data point-in-time image of data in the storage system. A configuration metadata point-in-time image may be created of metadata identifying a configuration of the storage system. The method provides for automatically synchronizing the data point-in-time image and the configuration metadata point-in-time image. Automatically synchronizing the data point-in-time image and the configuration metadata point-in-time image may include attaching a first tag to the data point-in-time image and a second tag to the configuration metadata point-in-time image. The first tag and the second tag may indicate the synchronization of the data point-in-time image and the configuration metadata point-in-time image. The first tag and the second tag may be accessible using an interface. The data point-in-time image and the configuration metadata point-in-time image may be created independently of each other and the first tag and the second tag may be generated independently of each other. The data point-in-time image and the configuration metadata point-in-time image may correspond to a storage volume of the storage system and/or a consistency group of multiple storage volumes of the storage system and/or multiple consistency groups of one or more storage systems.

According further to the system described herein, a non-transitory computer readable medium stores software for performing point-in-time image processing in a storage system. Executable code is provided that creates a data point-in-time image of data in the storage system. Executable code is provided that creates a configuration metadata point-in-time image of metadata identifying a configuration of the storage system. Executable code is provided that automatically synchronizes the data point-in-time image and the configuration metadata point-in-time image. The executable code that automatically synchronizes the data point-in-time image and the configuration metadata point-in-time image may include executable code that attaches a first tag to the data point-in-time image and a second tag to the configuration metadata point-in-time image. The first tag and the second tag may indicate a synchronization of the data point-in-time image and the configuration metadata point-in-time image. The first tag and the second tag may be accessible using an interface. The data point-in-time image and the configuration metadata point-in-time image may be created independently of each other and the first tag and the second tag may be generated independently of each other. The data point-in-time image and the configuration metadata point-in-time image may correspond to a storage volume of the storage system and/or a consistency group of multiple storage volumes of the storage system and/or multiple consistency groups of one or more storage systems.

According further to the system described herein, a method for performing rollback processing of a storage system includes determining a prior state of the storage system for rollback. A data point-in-time image of the storage system corresponding to the prior state is identified. Data of the storage system corresponding to the data point-in-time image is rolled back. A configuration metadata point-in-time image of the storage system corresponding to the prior state is identified. A configuration of the storage system corresponding to the configuration metadata point-in-time image is rolled back. The data point-in-time image and the configuration metadata point-in-time image may be automatically synchronized. Synchronization of the data point-in-time image and the configuration metadata point-in-time image may be indicated using a first tag of the data point-in-time image and a second tag of the configuration metadata point-in-time image. The rolling back of the data using the data point-in-time image may be independent of the rolling back of the configuration using the configuration metadata point-in-time image. The method may further include rolling the storage system forward to restore an original state of the storage system to a state prior to the rollback processing, in which the rolling forward corresponds to data of the storage system at the original state and/or configuration of the storage system at the original state. The data point-in-time image and the configuration metadata point-in-time image may correspond to a storage volume of the storage system and/or a consistency group of multiple storage volumes of the storage system and/or multiple consistency groups of one or more storage systems According further to the system described herein, a non-transitory computer readable medium storing software for performing rollback processing of a storage system. Executable code is provided that enables determination of a prior state of the storage system for rollback. Executable code is provided that identifies a data point-in-time image of the storage system corresponding to the prior state. Executable code is provided that rolls back data of the storage system corresponding to the data point-in-time image. Executable code is provided that identifies a configuration metadata point-in-time image of the storage system corresponding to the prior state. Executable code is provided that rolls back a configuration of the storage system corresponding to the configuration metadata point-in-time image. The data point-in-time image and the configuration metadata point-in-time image may be automatically synchronized. Synchronization of the data point-in-time image and the configuration metadata point-in-time image may be indicated using a first tag of the data point-in-time image and a second tag of the configuration metadata point-in-time image. The rolling back of the data using the data point-in-time image may be independent of the rolling back of the configuration using the configuration metadata point-in-time image. Executable code may be provided that rolls the storage system forward to restore an original state of the storage system to a state prior to the rollback processing, in which the rolling forward corresponds to at least one of: data of the storage system at the original state or configuration of the storage system at the original state. The data point-in-time image and the configuration metadata point-in-time image may correspond to a storage volume of the storage system and/or a consistency group of multiple storage volumes of the storage system and/or multiple consistency groups of one or more storage systems

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1:
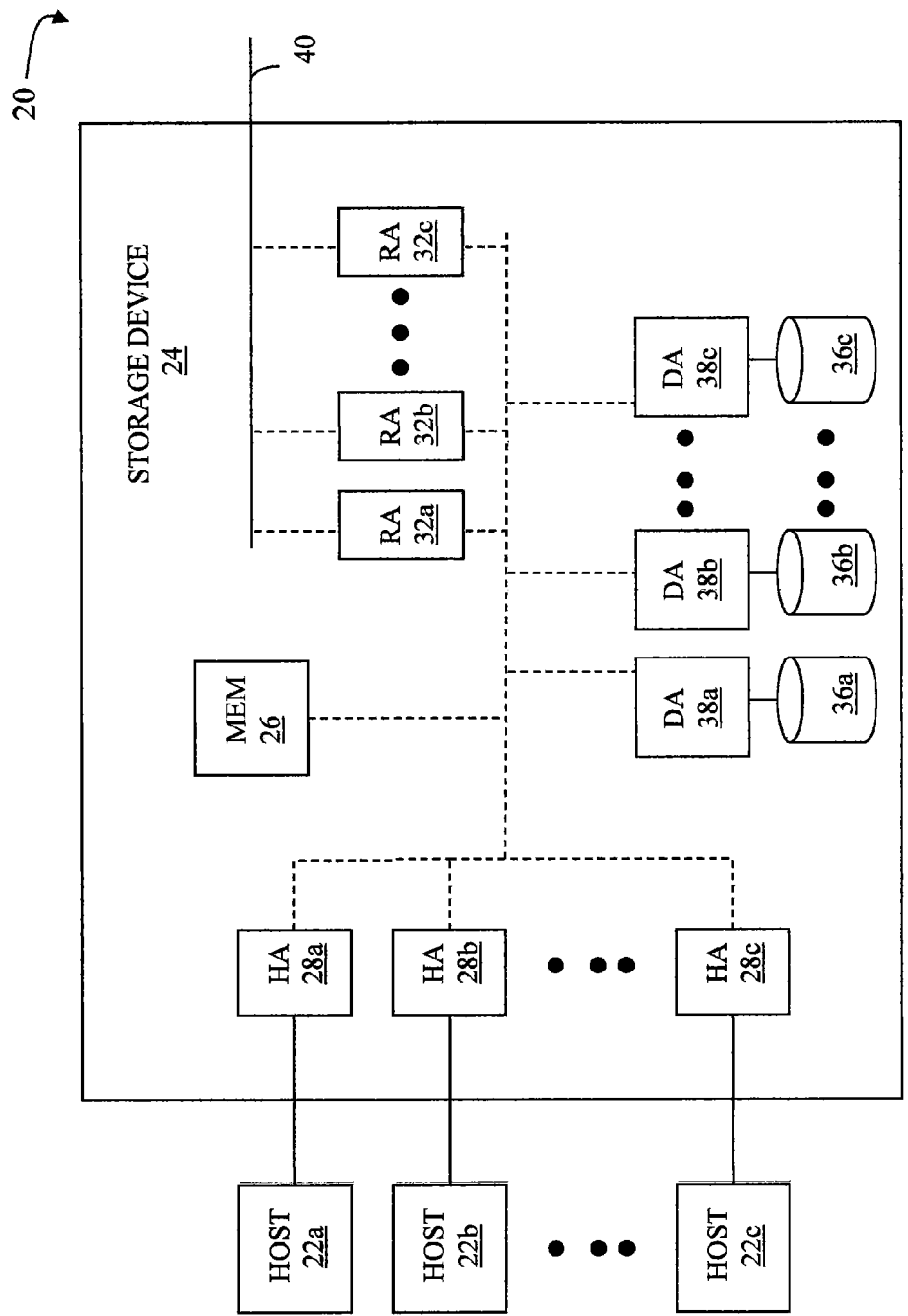
FIG. 1 is a schematic diagram showing a plurality of hosts coupled to a data storage device that may be used in connection with an embodiment of the system described herein.

FIG. 1 is a schematic diagram 20 showing a plurality of hosts 22a-22c coupled to a data storage device 24 that may be used in connection with an embodiment of the system described herein. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts. In various embodiments, the storage device 24 may be a Symmetrix storage device, a CLARiiON storage device and/or a VPLEX product produced by EMC Corporation of Hopkinton, Mass., although the system described herein may also operate in connection with any other suitable storage device and products.

In an embodiment, the storage device 24 may include one or more Remote Data Facility (RDF) adapter units (RA's) 32a-32c. An RDF product produced by EMC Corporation, may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to an RDF link 40 and are similar to the HA's 28a-28c, but are used to transfer data between the storage device 24 and other storage devices that are also coupled to the RDF link 40. The storage device 24 may be coupled to additional RDF links (not shown) in addition to the RDF link 40. For further discussion of RDF and the use thereof in data recovery and storage techniques, see, for example, U.S. Pat. No. 5,742,792 to Yanai, et al., entitled "Remote Data Mirroring" and U.S. Pat. No. 7,779,291 to Yoder et aL, entitled "Four Site Triangular Asynchronous Replication," which are incorporated herein by reference and are assigned to EMC Corporation.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 24 that corresponds to the disks 36a-36c may be subdivided into a plurality of volumes or logical devices. The logical storage space may also be merged in connection with use of a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail. The storage device 24 may be provided as a stand-alone device coupled to the hosts 22a-22c as shown in FIG. 1 or, alternatively, the storage device 24 may be part of, and/or otherwise coupled to, a storage area network (SAN) that may include a plurality of other storage devices as well as switches, routers, network connections, etc., as further discussed elsewhere herein.

Figure 2:
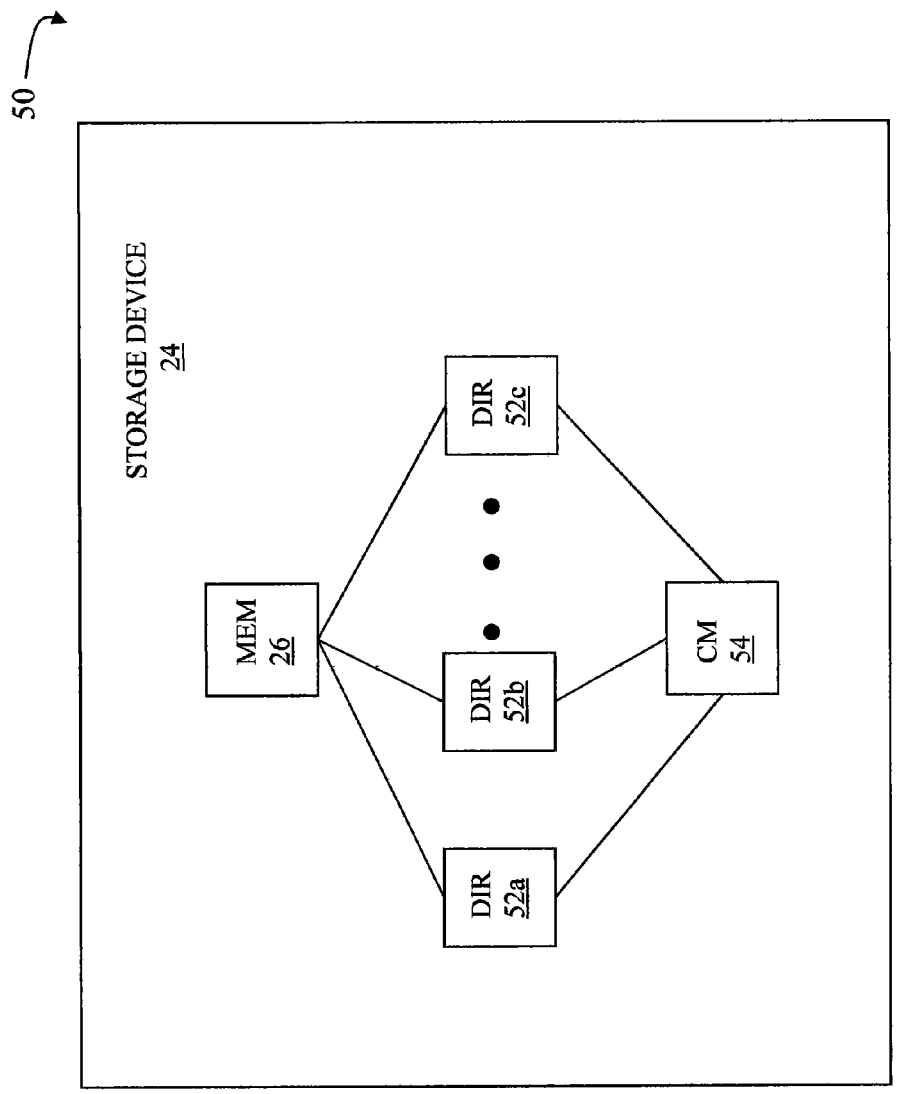
FIG. 2 is a schematic diagram illustrating an embodiment of the storage device where each of a plurality of directors are coupled to the memory.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The switches may be programmed to allow connections between specific ports of devices coupled to the switches. A port that can initiate a data-path connection may be called an "initiator" port while the other port may be deemed a "target" port.

Figure 3:
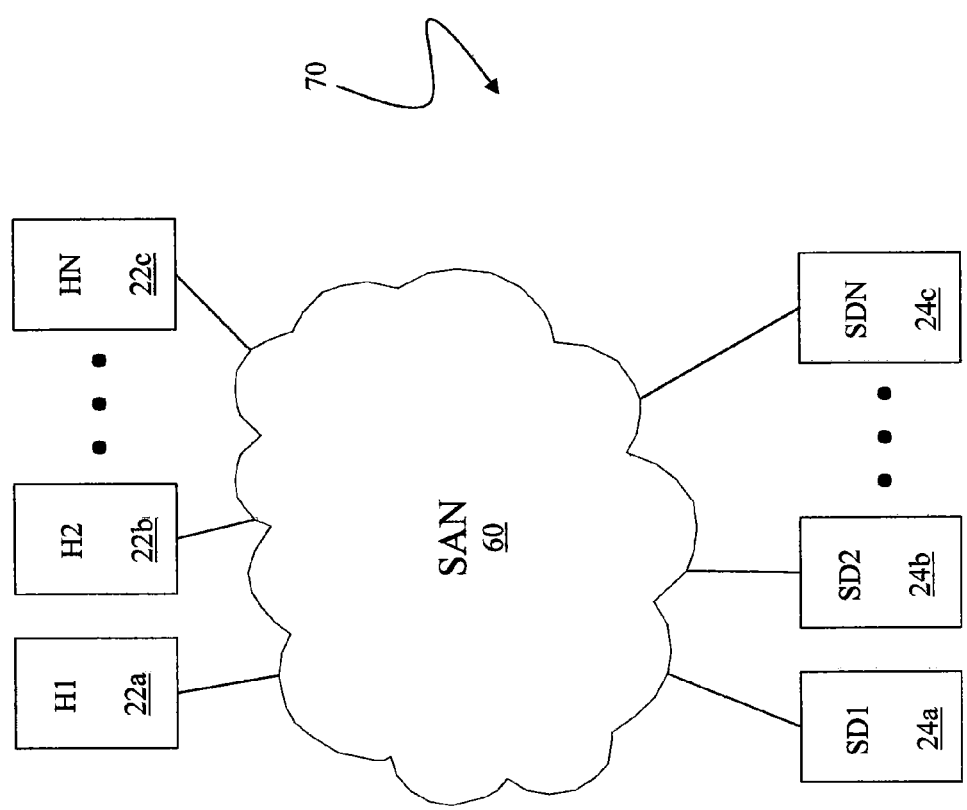
FIG. 3 is a schematic illustration showing a storage area network (SAN) providing a SAN fabric coupling a plurality of host devices (H1-HN) to a plurality of storage devices (SD1-SDN) that may be used in connection with an embodiment of the system described herein.

FIG. 3 is a schematic illustration 70 showing a storage area network (SAN) 60 providing a SAN fabric coupling a plurality of host devices (H1-HN) 22a-c to a plurality of storage devices (SD1-SDN) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage device 24a. Upon becoming activated (e.g., powering up), the host 22a and the storage device 24a may send appropriate signals to the switch(es) of the storage area network 60, and each other, which then allows the host 22a to initiate a data-path connection between the port of the host 22a and the port of the storage device 24a. Zones may be defined in terms of a unique identifier associated with each of the ports, such as such as a 64-bit world-wide port name (WWPN).

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from EMC Corporation.

Figure 4:
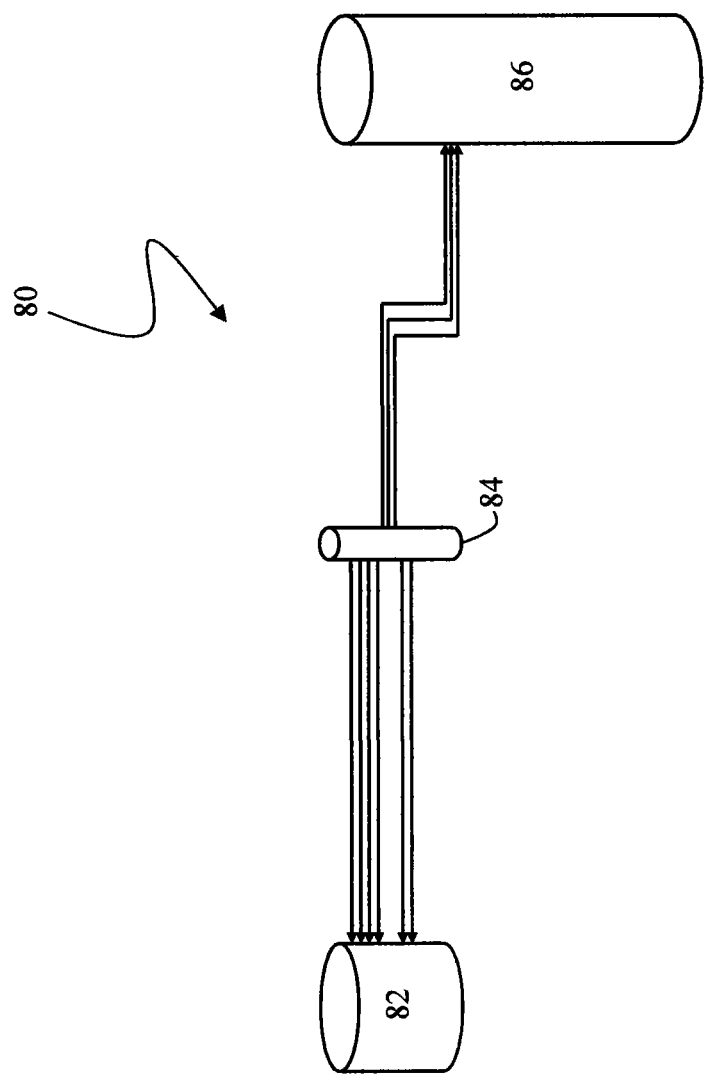
FIG. 4 is a schematic diagram showing a standard logical device, a point-in-time copy device, and a journal (or log) device that may be used in connection with an embodiment of the system described herein

FIG. 4 is a schematic diagram 80 showing a standard logical device 82, a point-in-time copy device 84, such as a snapshot copy device and/or other appropriate point-in-time copy device, and a journal (or log) device 86 that may be used in connection with an embodiment of the system described herein. The standard logical device 82 may be implemented using any appropriate storage logical device mechanism, such as logical storage devices used on a Symmetrix and/or VPLEX product provided by EMC Corporation, and used to access corresponding physical storage disks, like disks 36a-c (see FIG. 1). Similarly, the point-in-time copy device 84 may be any logical or virtual device that can provide point-in-time copy functionality for the logical device 82. As discussed herein, the point-in-time copy device 84 may represent a point in time copy of all or a portion of the standard logical device 82. A host coupled to a storage device that accesses the point-in-time copy device 84 may access the point-in-time copy device 84 in the same way that the host would access the standard logical device 82. However, the point-in-time copy device 84 does not contain any track data from the standard logical device 82. Instead, the point-in-time copy device 84 includes a plurality of table entries that point to tracks on either the standard logical device 82 or the journal device 86.

When the point-in-time copy device 84 is established (e.g., when a point in time copy is made of the standard logical device 82), the point-in-time copy device 84 is created and provided with appropriate table entries that, at the time of establishment, point to tracks of the standard logical device 82. A host accessing the point-in-time copy device 84 to read a track would read the appropriate track from the standard logical device 82 based on the table entry of the point-in-time copy device 84 pointing to the track of the standard logical device 82.

After the point-in-time copy device 84 has been established, it is possible for a host to write data to the standard logical device 82. In that case, the previous data that was stored on the standard logical device 82 is copied to the journal device 86 and the table entries of the point-in-time copy device 84 that previously pointed to tracks of the standard logical device 82 would be modified to point to the new tracks of the journal device 86 to which the data had been copied. Thus, a host accessing the point-in-time copy device 84 would read either tracks from the standard logical device 82 that have not changed since the point-in-time copy device 84 was established or, alternatively, would read corresponding tracks from the journal device 86 that contain data copied from the standard logical device 82 after the point-in-time copy device 84 was established. Adjusting data and pointers in connection with reads and writes to and from the standard logical device 82 and journal device 84 is discussed in more detail elsewhere herein.

In an embodiment described herein, hosts would not have direct access to the journal device 86. That is, the journal device 86 would be used exclusively in connection with the point-in-time copy device 84 (and possibly other point-in-time copy devices as described in more detail elsewhere herein). In addition, for an embodiment described herein, the standard logical device 82, the point-in-time copy device 84, and the journal device 86 may be provided on the single storage device 24. However, it is also possible to have portions of one or more of the standard logical device 82, the point-in-time copy device 84, and/or the journal device 86 provided on separate storage devices that are appropriately interconnected.

It is noted that the system described herein may be used with data structures and copy mechanisms other than tables and/or pointers to tracks discussed, for example, in connection with snapshots and/or other point-in-time copies. For example, the system described herein may also operate in connection with use of clones and/or deep copy backups automatically synchronized between data and metadata. Accordingly, the system described herein may be applied to any appropriate point-in-time copy processing systems and techniques, and it should be understood that the discussions herein with respect to the creation and use of "snapshots," and the devices thereof, may be equally applied to the use of any appropriate point-in-time image used for point-in-time copy processes in connection with protection of data and configuration metadata that enable the rolling back/forward of a storage system using the point-in-time images of the data and configuration metadata according to the system described herein.

Figure 5:
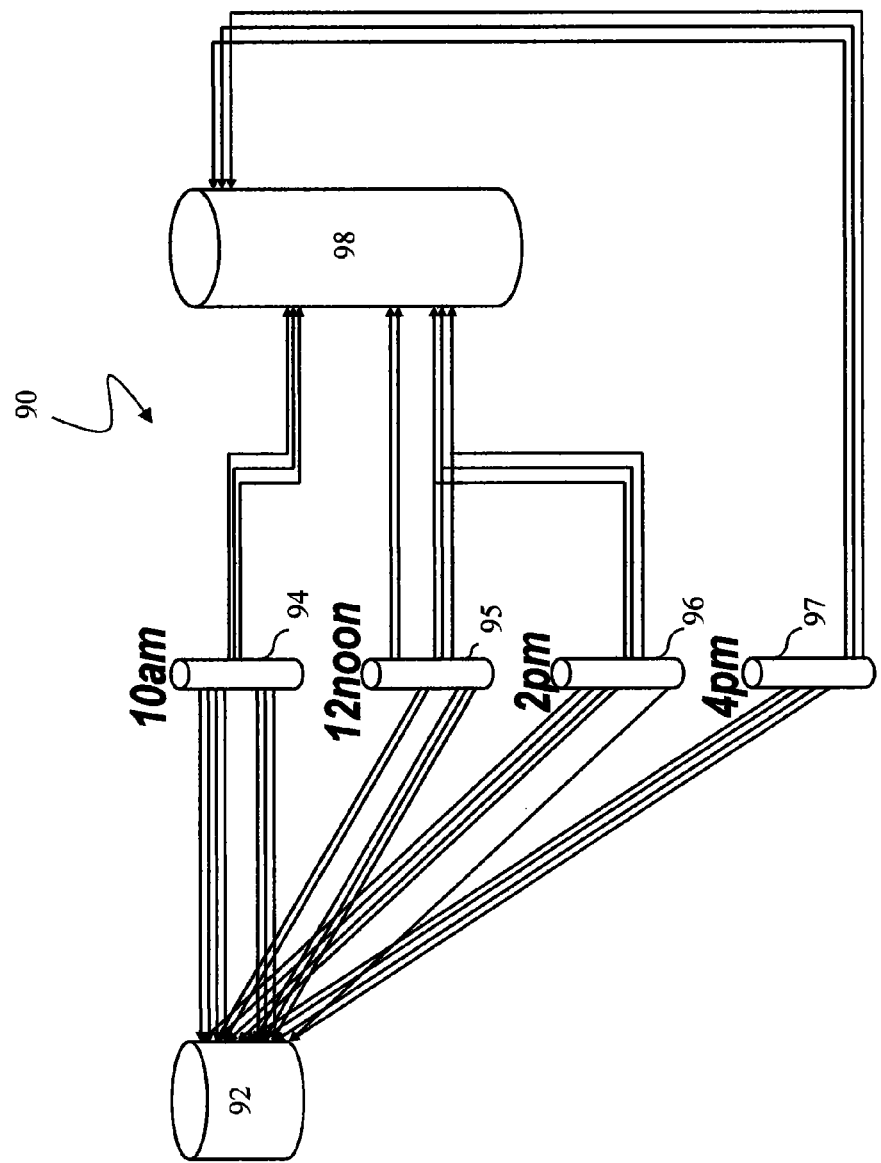
FIG. 5 is a schematic diagram showing another example of the use of virtual devices including a standard logical device, a plurality of point-in-time copy devices and a journal device that may be used in connection with an embodiment of the system described herein.

FIG. 5 is a schematic diagram 90 showing another example of the use of virtual devices including a standard logical device 92, a plurality of point-in-time copy devices 94-97 and a journal device 98 that may be used in connection with an embodiment of the system described herein. In the illustrated example, the point-in-time copy device 94 represents a point in time copy of the standard logical device 92 taken at ten a.m. Similarly, the point-in-time copy device 95 represents a copy of the standard logical device 92 taken at twelve noon, the point-in-time copy device 96 represents a copy of the standard logical device 92 taken at two p.m., and the point-in-time copy device 97 represents a copy of the standard logical device 92 taken at four p.m. Note that all of the point-in-time copy devices 94-97 may share the journal device 98. In addition, it is possible for table entries of more than one of the point-in-time copy devices 94-97, or, a subset of the table entries of the point-in-time copy devices 94-97, to point to the same tracks of the journal device 98. For example, the point-in-time copy device 95 and the point-in-time copy device 96 are shown as having table entries that point to the same tracks of the journal device 98.

In an embodiment discussed herein, the journal device 98, and/or other journal devices discussed herein, may be provided by a pool of journal devices that are managed by the storage device 24 and/or other controller coupled to the SAN. In that case, as a point-in-time copy device requires additional tracks of a journal device, the point-in-time copy device would cause more journal device storage to be created (in the form of more tracks for an existing journal device or a new journal device) using the journal device pool mechanism. Pooling storage device resources in this manner is known in the art. Other techniques that do not use pooling may be used to provide journal device storage.

Figure 6:
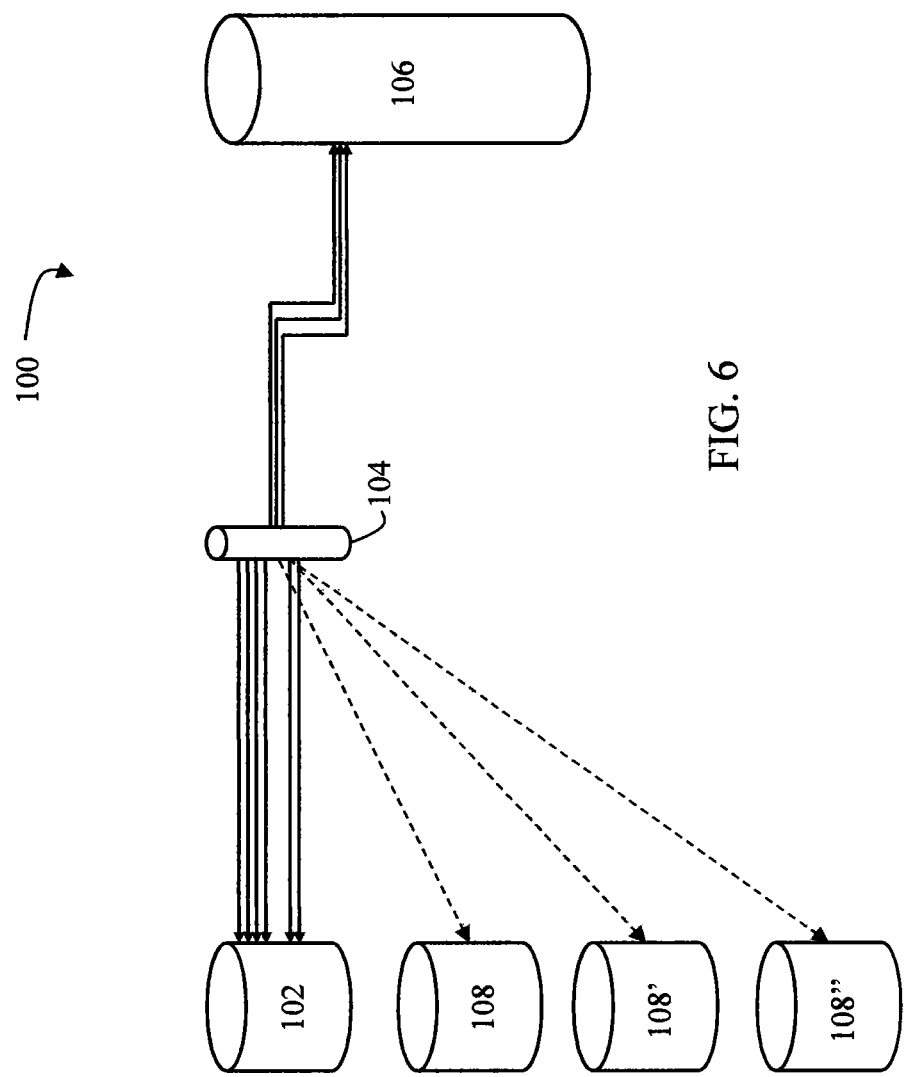
FIG. 6 is a schematic diagram that illustrates a system including a logical device, a point-in-time copy device, a journal device, and a full copy device that may be used in connection with an embodiment of the system described herein.

FIG. 6 is a schematic diagram 100 that illustrates a system including a logical device 102, a point-in-time copy device 104, a journal device 106, and a full copy device 108 that may be used in connection with an embodiment of the system described herein. As noted elsewhere herein, the logical device 102 may be implemented using any appropriate storage logical device mechanism. Similarly, the point-in-time copy 104 may be any logical point-in-time copy device that can provide snapshot functionality, and/or other appropriate point-in-time copy functionality, for the logical device 102. The journal device 106 provides storage for sections of data (e.g., tracks) of the logical device 102 that are overwritten after the point-in-time copy 104 has been initiated. The journal device 106 may be provided on the same physical device as the logical device 102 or may be provided on a different physical device.

The full copy device 108 may be a logical storage device like the logical device 102. As discussed in more detail elsewhere herein, the full copy device 108 may be configured to contain data copied from the logical device 102 and corresponding to the point-in-time copy 104. As described below, the point-in-time copy 104 may be created and then, subsequently, data from the logical device 102, and possibly the journal device 106, may be copied and/or refreshed to the full copy device 108 in a background process that does not interfere with access to the logical device 102. Once the copy is complete, then the point-in-time copy 104 is protected from physical corruption of the data of the logical device 102, as discussed in more detail elsewhere herein. Note that, as shown in the figure, it is possible to have multiple copy devices 108', 108" etc. so that all of the copy devices 108, 108', 108" protect the point-in-time copy 104 from physical corruption. Accordingly, for the discussion herein, it should be understood that references to the copy device 108 may include, where appropriate, references to multiple copy devices. Note that, for some embodiments, the copy devices 108, 108', 108" may be copies provided at different times. Similarly, the system described herein may be applicable to multiple point-in-time copies provided at the same time or different times, like that shown in FIG. 5.

Figure 7:
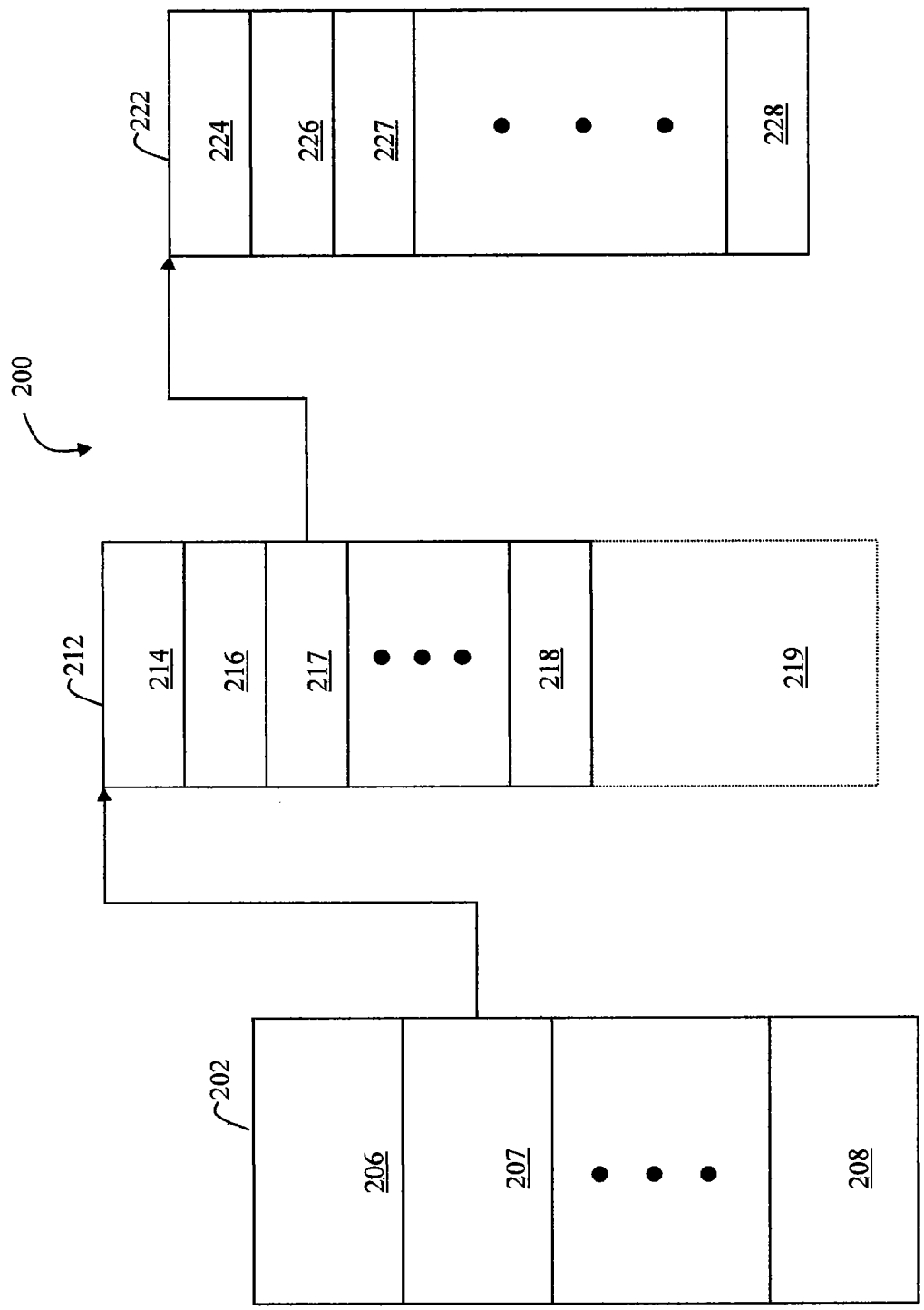
FIG. 7 is a schematic diagram illustrates tables that may be used to keep track of device information that may be used in accordance with embodiments of the system described herein.

FIG. 7 is a schematic diagram 200 illustrates tables that may be used to keep track of device information that may be used in accordance with embodiments of the system described herein. A first table 202 may correspond to all of the devices used by a storage device or by an element of a storage device, such as an HA and/or a DA. The table 202 includes a plurality of logical device entries 206-208 that correspond to all the logical devices used by the storage device (or portion of the storage device). The entries in the table 202 include descriptions for standard logical devices, virtual devices, journal devices, and/or other types of logical devices.

Each of the entries 206-208 of the table 202 may correspond to another table that contains information for each of the logical devices. For example, the entry 207 may correspond to a table 212. The table 212 includes a header that contains overhead information. The table 212 also includes entries 216-218 for each of the cylinders of the logical device. In an embodiment disclosed herein, a logical device may contain any number of cylinders depending upon how the logical device is initialized. However, in other embodiments, a logical device may contain a fixed number of cylinders. The table 212 is shown as including a section for extra track bytes 219. The extra track bytes 219 may be used in connection with the journal devices as discussed elsewhere herein. For devices that are not log devices, the extra track bytes 219 may not be used.

Each of the cylinder entries 216-218 corresponds to a track table. For example, the entry 217 may correspond to a track table 222 that includes a header 224 having overhead information. The track table 222 also includes entries 226-228 for each of the tracks. In various embodiments herein, different numbers of tracks for each of the cylinders or even a variable number of tracks for each cylinder may be provided. For standard logical devices and journal devices, the information in each of the entries 226-228 includes a pointer (either direct or indirect) to the physical address on one of the disk drives 36a-c of the storage device 24 (or a remote storage device if the system is so configured). Thus, the track table 222 may be used to map logical addresses of the logical device corresponding to the tables 202, 212, 222 to physical addresses on the disk drives 36a-c of the storage device 24. For virtual devices, each of the entries 226-228 of the table 222 points to a track of a corresponding standard logical device or corresponding journal device. For other embodiments, however, it may be possible to use a different mechanism where the tables 202, 222, 222 are used only for standard logical devices that contain tracks of data while another type of table, such as a simple array of tracks, is used by virtual devices to map tracks of the virtual devices to tracks of corresponding standard logical devices or journal devices.

Each track of a journal device may be either free, meaning that it is not being used by a virtual device, or may be assigned, meaning that the track is pointed to by a table entry in one or more of the virtual devices. In an embodiment disclosed herein, the tracks of a journal device are managed by first creating a doubly linked list of all of the free tracks of the journal device. The pointers for the doubly linked list are provided by the extra track bytes 219 of the table 212 so that the extra track bytes 219 for a journal device contains a number of bytes for every track of the journal device. For every track of the journal device that is free, the extra bytes may include a forward pointer pointing to the next free track of the journal device and a backward pointer pointing to the previous free track of the journal device. Using a doubly linked list in this manner facilitates accessing free tracks of the journal device.

In addition, if a track of a journal device is assigned (i.e., is used by one or more virtual devices), the corresponding extra track bytes 219 for the track may be used to point back to the corresponding track of the standard logical device. Thus, when a write is performed to the standard logical device after the virtual device has been established, the data from the standard logical device is copied to a new track of the journal device and the extra track bytes corresponding to the new track of the journal device are made to point back to the track of the standard logical device from which the data came. Having each track of the journal device point back to the corresponding track of the standard logical device is useful in, for example, data recovery situations.

In addition, for an embodiment disclosed herein, the pointers for the extra bytes per track for an assigned track are stored with the data. That is, when a particular track of a journal device is assigned, the pointer back to the corresponding track of a standard logical device is stored with the extra track bytes 219 and, in addition, the pointer may be stored with the track data itself on the track of the journal device. The tables 202, 212, 222 may be stored in the global memory 26 of the storage device 24. In addition, the tables corresponding to devices accessed by a particular host may be stored in local memory of the corresponding one of the HA's 28a-c. In addition, the RNs 32a-c and/or the DA's 38a-c may also use and locally store portions of the tables 202, 212, 222.

Continuous snapshotting (CS) refers to a process of taking snapshots of any content change in a storage management system. In connection with the content being user data, the process may be referred to as continuous data protection (CDP). In a CS/CDP implementation, individual writes to storage are duplicated and stored in a log of activity in one or more journal devices (e.g., the journal device 106). By replaying these writes in reverse, storage may be "rolled back" to any past state which was covered by the logs. This may be done on production storage, or in an duplicate copy of the storage to avoid disruption to users of the production storage. In the latter case, when access to historic data is no longer required, the log may be replayed again in forward order (possibly including logged writes that occurred since rollback) to restore the duplicate to the production state. For further discussion of techniques for providing continuous data protection, reference is made, for example, to U.S. Pat. No. 8,046,545 to Meiri et al., entitled "Continuous Backup," which discloses a system for providing continuous back of a storage device and restoring the storage device to prior states; U.S. Pat. No. 7,558,926 to Oliveira et al., entitled "Continuous Data Backup Using Distributed Journaling," which discloses techniques for providing continuous data backups of primary storage using distributed journals; and U.S. Pat. No. 7,840,595 to Blitzer et al., entitled "Techniques for Determining An Implemented Data Protection Policy," which discloses determining a data protection method in accordance with a facility and replication type associated with each of one or more selected recovery points of one or more storage objects. The above-noted references are incorporated herein by reference and are assigned to EMC Corporation.

It is noted that the system described herein may be used in connection with use of consistency groups and with features for maintaining proper ordering of writes between storage devices. A consistency group represents a grouping of storage volumes (virtual or not) which together offer an application consistent image of the data. Reference is made to U.S. Pat. No. 7,475,207 to Bromling et al., entitled "Maintaining Write Order Fidelity on a Multi-Writer System," that discloses a system for maintaining write order fidelity (WOF) for totally active storage system implementations using WOF groups and including application to features such as point-in-time snapshots and continuous data protection, and to U.S. Pat. No. 7,054,883 to Meiri et al., entitled "Virtual Ordered Writes for Multiple Storage Devices," that discloses features for ordering data writes among groups of storage devices. The above-noted references are incorporated herein by reference and are assigned to EMC Corporation.

According to an embodiment of the system described herein, content protected by point-in-time copies, such as snapshots, e.g. in connection with CS/CDP, may be extended to include not only user data but further include configuration metadata, and/or other appropriate configuration information, of the storage management system. Configuration metadata of the storage management system may be information used for configuration volumes, storage devices, consistency groups and/or other appropriate storage management system elements, as further discussed elsewhere herein. A user may want to rollback a storage management system to a past point due to performance or stability issues attributed to configuration changes. The system described herein enables rollback to prior states based on storage configuration metadata in addition to rollback of user data and provides for synchronization of the data and configuration metadata in connection with a rollback, as further discussed elsewhere herein.

In an embodiment, the system described herein provides for a data snapshot stream and a storage management configuration snapshot stream. The data snapshot stream and the configuration snapshot stream may be automatically synchronized according to techniques described herein. The unified snapshot stream may then be rolled backwards or forwards. Thus, data commits are snapshot together with their current storage management configuration. Therefore, upon rollback to a previous snapshot, the resulting data content is in sync with the storage management configuration it was generated with.

Figure 8:
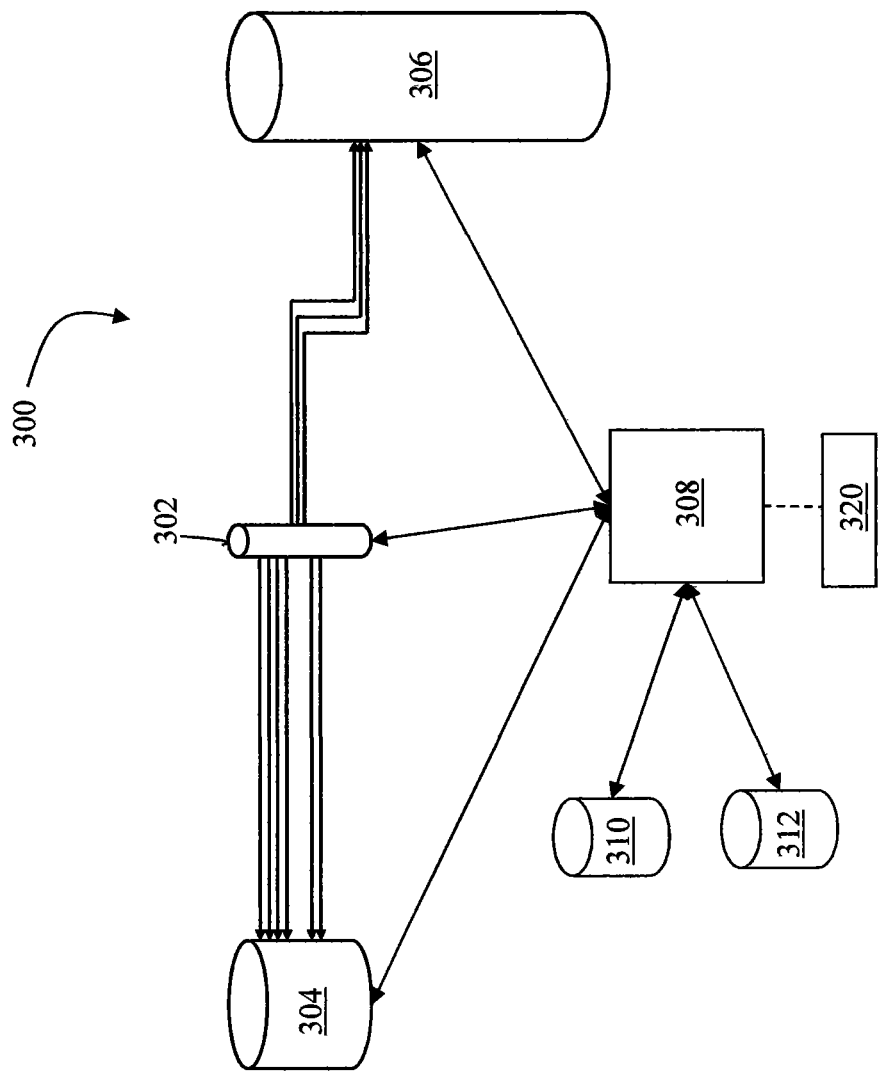
FIG. 8 is a schematic diagram that illustrates a continuous protection device that facilitates continuous or near continuous backup of data and storage configuration metadata using snapshots, other appropriate point-in-time images, according to an embodiment of the system described herein.

FIG. 8 is a schematic diagram 300 that illustrates a continuous protection device 302 that facilitates continuous or near continuous backup of data and storage configuration metadata using snapshots, and/or other appropriate point-in-time copies, according to an embodiment of the system described herein. The continuous protection device 302 may contain pointers to a standard logical device 304 for a plurality of tracks such that, for any particular track, if the continuous protection device 302 points to a corresponding track of the standard logical device 304, then the corresponding track has not changed since creation of the continuous protection device 302. Note that any subsections, besides track, may be used to implement the system described herein. Accordingly, it should be understood in connection with the discussion that follows that although tracks are mentioned, other units of data having another size, including variable sizes, may be used. The continuous protection device 302 also contains pointers to a journal device 306 for a plurality of corresponding tracks. The journal device 306 contains data for tracks that have changed since creation of the continuous protection device 302.

The diagram 300 also shows an I/O module 308 that handles input and output processing to and from other modules, such as input and output requests made by the DA's 38a-38c and HA's 28a-28c. The I/O module 308 may be provided with information from a cycle counter 310 and/or a timer 312, among other possible information sources, that may be used to synchronize storage for a plurality of storage devices (i.e., a consistency group). The I/O module 308 may further include, and/or be coupled to, a user interface 320 that enables a user to tag data and configuration metadata streams, as further discussed elsewhere herein. The user interface may be implemented using appropriate software and processors and may include a display and/or otherwise include operation using a display.

Figure 9:
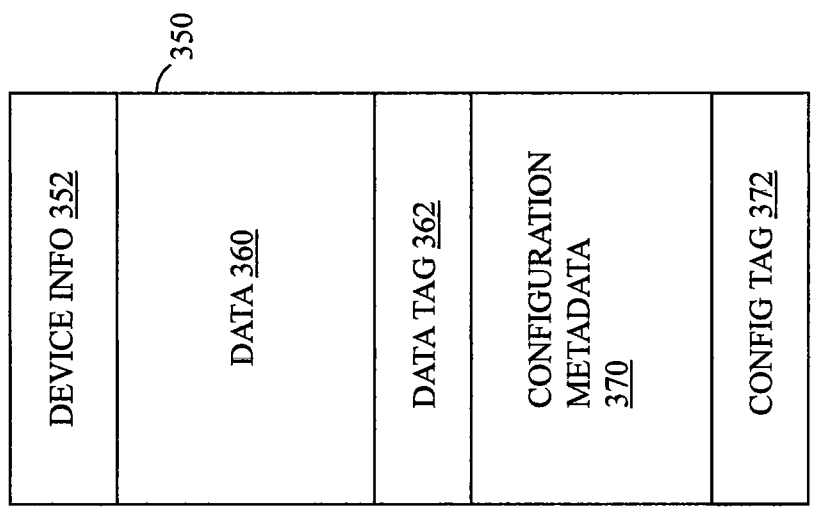
FIG. 9 is a schematic illustration showing a data structure that may be used to store and manage data and configuration metadata for a storage system in connection with continuous snapshotting in accordance with an embodiment of the system described herein.

FIG. 9 is a schematic illustration showing a data structure 350 that may be used to store and manage data and configuration metadata for a storage system in connection with continuous snapshotting in accordance with an embodiment of the system described herein. The data structure 350 may be stored on a journal device and/or other appropriate device according to the system described herein. The data structure 350 may include a device info field 352. The device info field includes device information such as a device identifier, cylinder, head, and length identifiers, and a track ID table. In other embodiments, different device information may be provided in the device info field 352.

The data structure 350 includes a field for point-in-time copy data 360, such as data undergoing continuous snapshot protection according to the system described herein.

Further, a field for configuration metadata 370 may be provided for the storage configuration metadata undergoing continuous snapshot protection according to the system described herein. It is noted that snapshots, or other appropriate point-in-time images, of the data 360 and metadata 370 may be taken separately and independently. A field may include tags 362 and/or other type of synchronization information for the data snapshot stream and a field may include tags 372 and/or other synchronization information for the configuration metadata snapshot stream. For example, timing information and/or cycle information may be provided, such as that provided by the cycle counter 310 and/or the timer 312.

Additionally, the tags 362 and 372 may include information accessed and controlled via the user interface 320. For example, human-readable tags may be attached to the data and configuration streams as the streams are formed. The user may then choose a pair of tags (one from each stream) to choose which configuration/data pair to roll back/forward to. Accordingly, the configuration snapshot stream and the data snapshot stream may be independently separate-able by a user, even though the streams may be synchronized by default. This allows the data stream and configuration stream to be independently rolled backwards or forwards as desired.

The system described herein allows for the ability to roll back/forward on multiple levels, including: per-volume basis, for configuration metadata and/or data; per-consistency group basis, for configuration metadata and/or data; per-system basis (all consistency groups, and system-wide configuration), for configuration metadata and/or data; and/or per-multi-system basis with the ability to control multiple systems with one user interface, for rolling management configuration and/or data. Other features and advantages of the system described herein include: elimination of manual storage configuration backups, which means reducing error-prone/inconvenient steps; elimination of manual storage configuration restores, which provides for reducing another set of error-prone/inconvenient steps; automatic write order fidelity across rollback in the presence of configuration changes; ability to control the roll back/forward points for management configuration/data independently. This allows choosing whether to roll management configuration back/forward only in those circumstances that warrant it; and/or ability to control the roll back/forward for configuration/data stream on a per volume and/or consistency-group and/or system-wide basis.

The system described herein allows for choosing the granularity of the roll back/forward of some of the system's volumes/consistency groups without requiring the whole system to roll back. Furthermore, the multi-system control aspect of the system described herein allows for restoring an organization's whole infrastructure (management configuration and data, independently) to a point in the past (or future) with the convenience of a single user interface.

In an aspect, a first use-case of the system described herein may involve write order fidelity of rollback data. In the scenario, a user may have expanded a virtual volume through concatenation of new back-end storage. Despite testing precautions in non-production environments, some issues escape unnoticed or do not show any symptoms in the original evaluation. After some time of running in a production environment, it is observed that unacceptable instability or performance threaten data availability. In an attempt to salvage the performance of the production environment, the user would like to revert the production environment to an older snapshot, both in terms of data and especially configuration, since it is unclear whether the new DU-inducing performance is due to the configuration change or data change. However, new data has already been committed to storage volumes from both before and after the virtual volume expansion. To maintain write order consistency after the rollback, the data rollback must be accompanied by a configuration rollback to match.

Known solutions may require a manual backup of the configuration of the storage volumes before the critical configuration takes place. The backup operation is part of a manual procedure and thus may be error prone. Upon rollback of the data, restoring a backup of configuration is also a manual operation which needs to be manually synchronized with the data rollback. Thus this configuration rollback may also inconvenient and error prone. The system described herein overcomes such disadvantages by providing for unified and synchronized rollback of both data and configuration metadata according to the features and techniques discussed herein.

In another aspect, a second use-case scenario may involve the rollback of complex configurations along with data. In the scenario, a Data Storage Provider (DSP) makes use of storage volume sets SVS-1 and SVS-2 to provide data storage for applications A-1 and A-2 for a particular customer C. The customer C may rely completely on DSP for all its storage needs. A-1 and A-2 have specific performance requirements which may require careful and constant tuning of SVS-1 and SVS-2. The DSP may snapshot all write operations on SVS-1 and SVS-2. Initially, application A-1 uses all of and only SVS-1 and application A-2 uses all of and only SVS-2. Application A-2 finishes running and the customer relinquishes SVS-2 to be used by application A-1.

Application A-1 runs for a while, making writes to SVS-1 and SVS-2. However, the customer C later realizes that application A-2's data is actually needed for a new experiment. The customer C would now like to roll back time, to retrieve the data on SVS-2 before writes of A-1's. To obtain consistency in the results of A-1 with previous results, the configuration needs to match the data image of SVS-2.

In the above-noted second use-case scenario, known solutions requiring explicit configuration backups may be inconvenient to the point of unfeasibility. In order to keep up with the constant tweaking of configuration changes, manual backups would have to be taken continuously before a rollback, and applied at every data rollback point, with each manual operation being error-prone. The system described herein again overcomes such disadvantages by providing for unified and synchronized rollback of both data and configuration metadata according to the features and techniques discussed herein.

In another aspect, a third use-case scenario of the system described herein may involve robust execution and analysis of testing systems. In the scenario, the user has executed part of a suite of system tests which both reconfigure and make use of virtual storage. At the time of a failure, according to the system described herein, the storage system's configuration and storage can be progressively rolled backwards until it reaches a state that is consistent on both the virtual storage and the configuration of the virtual storage, and understood by an administrator or engineer. After optional analysis of the situation, configuration and storage can further be rolled back to a safe state for continued testing, obviating the need for complex, time-consuming or unreliable cleanup processes.

Figure 10:
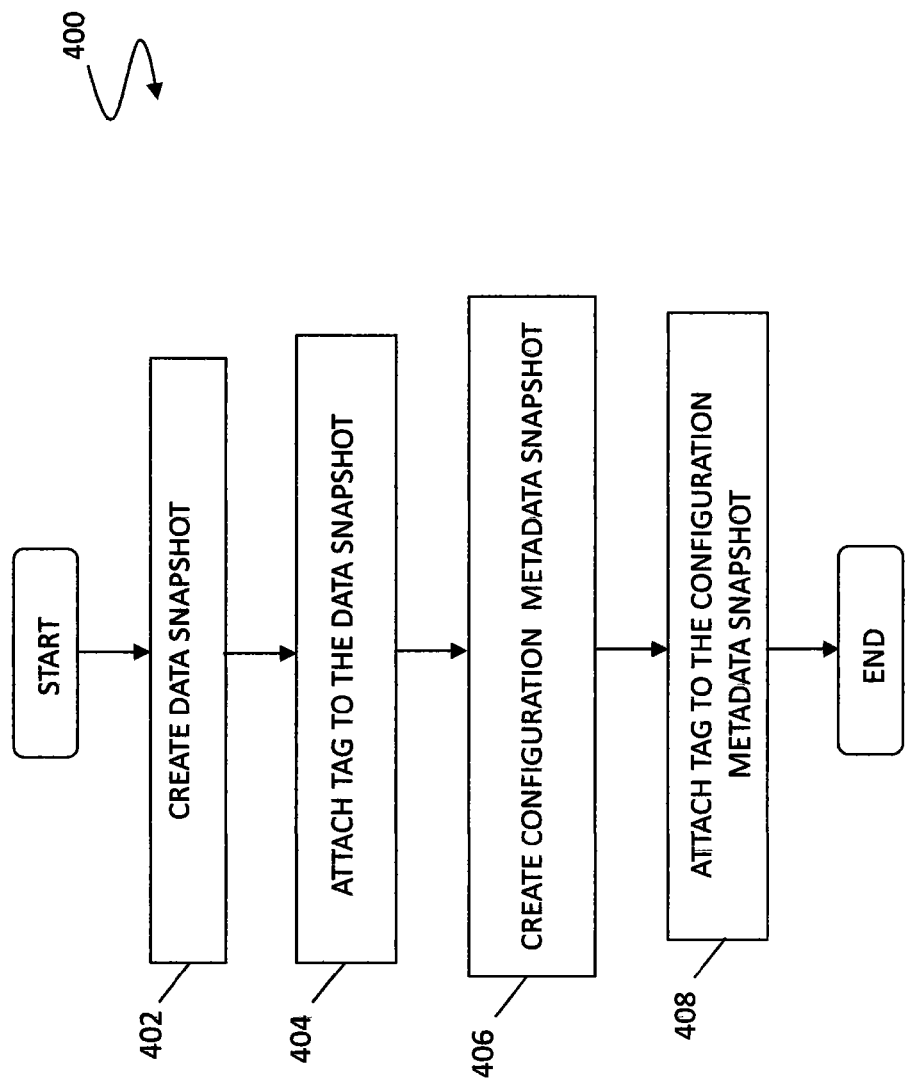
FIG. 10 is a flow diagram showing data and configuration metadata snapshot processing in a storage management system according to an embodiment of the system described herein.

FIG. 10 is a flow diagram 400 showing data and configuration metadata snapshot processing in a storage management system according to an embodiment of the system described herein. At a step 402, a data snapshot, and/or other appropriate point-in-time image, is created of the storage management system. The snapshot may be created in connection with a continuous protection system following a change to the data. After the step 402, at a step 404, a tag is attached to the data snapshot allowing for the data snapshot to be synchronized in accordance with the system described herein. In an embodiment, the tag may include timer and/or cycle count information and may be human-readable via a user interface. After the step 404, processing proceeds to a step 406 where a snapshot, and/or other appropriate point-in-time image, is created of the configuration metadata for the storage management system. After the step 406, processing proceeds to a step 408 where a tag is attached to the configuration snapshot allowing for synchronization of the configuration snapshot with the data snapshot. It is noted that the tags attached in the steps 404 and 408 may be human-readable to allow for a user to identify the synchronization of the data with the configuration metadata. It is noted that the above-noted steps may be performed in a different order in accordance with the system described herein. After step 408, processing is complete.

Figure 11:
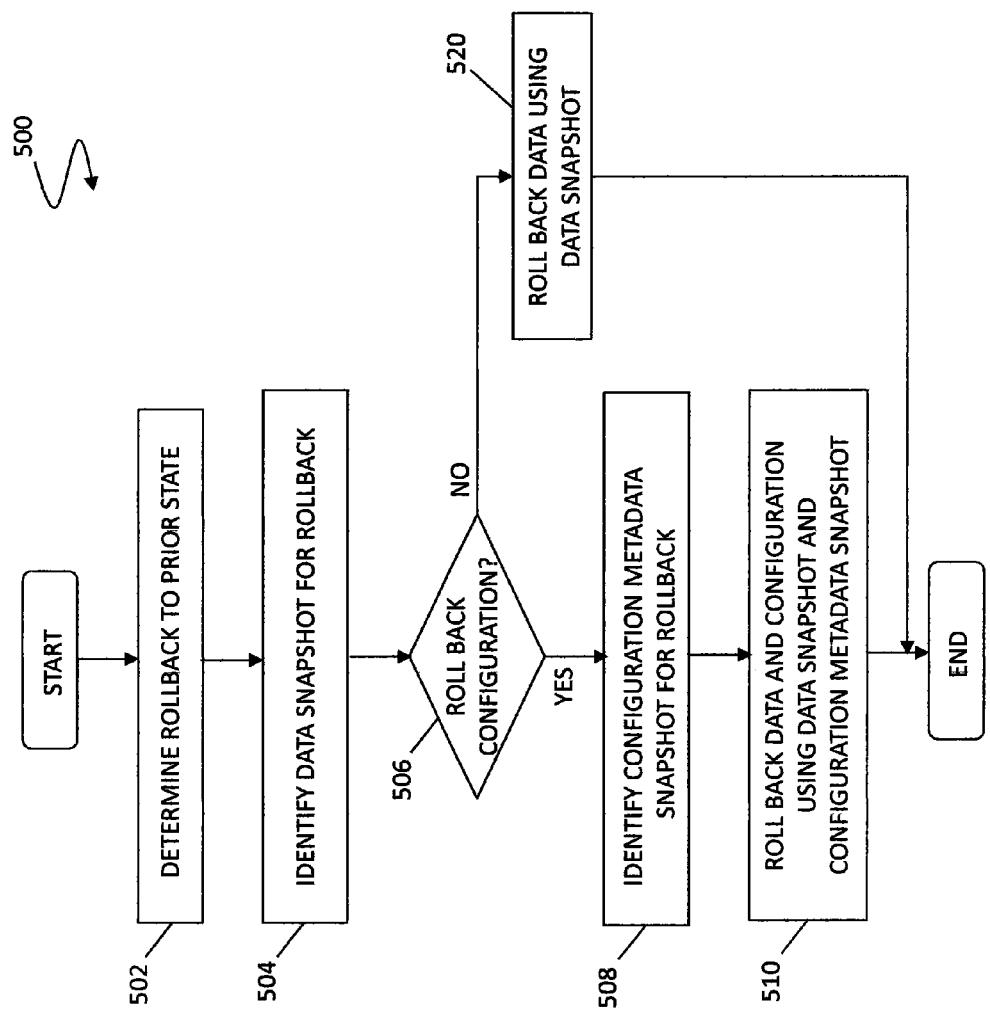
FIG. 11 is a flow diagram showing rollback processing according to an embodiment of the system described herein.

FIG. 11 is a flow diagram 500 showing rollback processing according to an embodiment of the system described herein. At a step 502, a determination is made to rollback to a prior state for which snapshots are available for the rollback. After the step 502, processing proceeds to a step 504 where the data snapshot for the desired rollback state is identified, for example, using a tag of the data that was attached when the snapshot was taken. After the step 504, processing proceeds to a test step 506 where it is determined whether rollback of the configuration for the storage management system is also desired. If no rollback of the configuration of the storage management system is desired than processing proceeds to a step 520 where roll back of the data, using only the selected data snapshot, is performed. After the step 520, processing is complete.

If rollback of the configuration is desired at the test step 506, then processing proceeds to a step 508 where the desired configuration metadata snapshot for the desired rollback is identified. In an embodiment, a configuration metadata snapshot is available that has been synchronized with the data snapshot, for example, using the tags of the data snapshot and the configuration metadata snapshot, which tags may be human-readable. In accordance with the system described herein, data and configuration snapshots may be taken independently but may be automatically synchronized according the tags attached to the data and configuration snapshots streams. In other embodiments, it is also possible for a user, via a user interface, to identify and select a different configuration metadata for rollback than the default configuration metadata snapshot that has been synchronized with the data snapshot for the desired rollback. After the step 508, processing proceeds to a step 510 where rollback of the data and configuration, using the selected data snapshot and configuration metadata snapshot, is performed. After the step 510, processing is complete. It is noted that the above-noted steps may also be performed in connection with roll forward processing.

Although the system described herein has been discussed in connection with the use of tracks as a unit of data for certain purposes, it should be understood that other units of data (including, possibly, variable length units of data) may be used. This also applies to other data structures and data units discussed herein. It is also noted that one or more storage devices having components as described herein may, alone or in combination with other devices, provide an appropriate platform that executes any of the steps described herein. The system may operate with any snapshot mechanism not inconsistent therewith and further with any appropriate point-in-time copy mechanism.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for performing rollback processing of a storage system, comprising:
   determining a prior state of the storage system for rollback;
   identifying a data point-in-time image of the storage system corresponding to the prior state;
   rolling back data of the storage system corresponding to the data point-in-time image;
   identifying a configuration metadata point-in-time image of the storage system corresponding to the prior state;
   attaching a first tag to the data point-in-time image and a second tag to the configuration metadata point-in-time image; and
   rolling back a configuration of the storage system corresponding to the configuration metadata point-in-time image, wherein the data point-in-time image and the configuration metadata point-in-time image are created independently of each other and wherein the first tag and the second tag are generated independently of each other.

2. The method according to claim 1, wherein the data point-in-time image and the configuration metadata point-in-time image are automatically synchronized, and wherein synchronization of the data point-in-time image and the configuration metadata point-in-time image is indicated using the first tag of the data point-in-time image and the second tag of the configuration metadata point-in-time image.

3. The method according to claim 1, wherein the rolling back of the data using the data point-in-time image is independent of the rolling back of the configuration using the configuration metadata point-in-time image.

4. The method according to claim 1, further comprising:
   rolling the storage system forward to restore an original state of the storage system to a state prior to the rollback processing, wherein the rolling forward corresponds to at least one of: data of the storage system at the original state or configuration of the storage system at the original state.

5. The method according to claim 1, wherein the data point-in-time image and the configuration metadata point-in-time image correspond to at least one of: (i) a storage volume of the storage system; (ii) a consistency group of multiple storage volumes of the storage system; or (iii) multiple consistency groups of one or more storage systems.

6. A non-transitory computer readable medium storing software for performing rollback processing of a storage system, the software comprising:
   executable code that enables determination of a prior state of the storage system for rollback;
   executable code that identifies a data point-in-time image of the storage system corresponding to the prior state;
   executable code that rolls back data of the storage system corresponding to the data point-in-time image;
   executable code that identifies a configuration metadata point-in-time image of the storage system corresponding to the prior state;
   executable code that attaches a first tag to the data point-in-time image and a second tag to the configuration metadata point-in-time image; and
   executable code that rolls back a configuration of the storage system corresponding to the configuration metadata point-in-time image, wherein the data point-in-time image and the configuration metadata point-in-time image are created independently of each other and wherein the first tag and the second tag are generated independently of each other.

7. The non-transitory computer readable medium according to claim 6,
   wherein the data point-in-time image and the configuration metadata point-in-time image are automatically synchronized, and wherein synchronization of the data point-in-time image and the configuration metadata point-in-time image is indicated using the first tag of the data point-in-time image and the second tag of the configuration metadata point-in-time image.

8. The non-transitory computer readable medium according to claim 6, wherein the rolling back of the data using the data point-in-time image is independent of the rolling back of the configuration using the configuration metadata point-in-time image.

9. The non-transitory computer readable medium according to claim 6, further comprising:
   executable code that rolls the storage system forward to restore an original state of the storage system to a state prior to the rollback processing, wherein the rolling forward corresponds to at least one of: data of the storage system at the original state or configuration of the storage system at the original state.

10. The non-transitory computer readable medium according to claim 6, wherein the data point-in-time image and the configuration metadata point-in-time image correspond to at least one of: (i) a storage volume of the storage system; (ii) a consistency group of multiple storage volumes of the storage system; or (iii) multiple consistency groups of one or more storage systems.

11. A data storage device, comprising:
    a plurality of disks that store data;
    a plurality of disk adaptors coupled to the disks;
    a memory coupled to the disk adaptors; and
    a plurality of host adaptors coupled to the memory, wherein a non-transitory computer readable medium stores software for performing rollback processing of a storage system, the software having executable code that enables determination of a prior state of the storage system for rollback, executable code that identifies a data point-in-time image of the storage system corresponding to the prior state, executable code that rolls back data of the storage system corresponding to the data point-in-time image, executable code that identifies a configuration metadata point-in-time image of the storage system corresponding to the prior state, executable code that attaches a first tag to the data point-in-time image and a second tag to the configuration metadata point-in-time image, and executable code that rolls back a configuration of the storage system corresponding to the configuration metadata point-in-time image, wherein the data point-in-time image and the configuration metadata point-in-time image are created independently of each other and wherein the first tag and the second tag are generated independently of each other.

12. The storage system according to claim 11, wherein the data point-in-time image and the configuration metadata point-in-time image are automatically synchronized, and wherein synchronization of the data point-in-time image and the configuration metadata point-in-time image is indicated using a first tag of the data point-in-time image and a second tag of the configuration metadata point-in-time image.

13. The storage system according to claim 11, wherein the rolling back of the data using the data point-in-time image is independent of the rolling back of the configuration using the configuration metadata point-in-time image.

14. The storage system according to claim 11, wherein the software also includes executable code that rolls the storage system forward to restore an original state of the storage system to a state prior to the rollback processing, wherein the rolling forward corresponds to at least one of: data of the storage system at the original state or configuration of the storage system at the original state.

15. The storage system according to claim 11, wherein the data point-in-time image and the configuration metadata point-in-time image correspond to at least one of: (i) a storage volume of the storage system; (ii) a consistency group of multiple storage volumes of the storage system; or (iii) multiple consistency groups of one or more storage systems.

* * * * *